United States Patent
Bortnik

(10) Patent No.: US 7,172,694 B2
(45) Date of Patent: Feb. 6, 2007

(54) FILTER ASSEMBLY

(75) Inventor: Christopher B Bortnik, Warrendale, PA (US)

(73) Assignee: Schroeder Industries, LLC, Leetsdale, PA (US)

( * ) Notice: Subject to any disclaimer, the term of this patent is extended or adjusted under 35 U.S.C. 154(b) by 0 days.

(21) Appl. No.: 10/764,996

(22) Filed: Jan. 26, 2004

(65) Prior Publication Data

US 2004/0222140 A1    Nov. 11, 2004

Related U.S. Application Data

(60) Provisional application No. 60/442,436, filed on Jan. 24, 2003.

(51) Int. Cl.
*B01D 27/14* (2006.01)
(52) U.S. Cl. .................. 210/251; 210/266; 210/282; 210/493.1
(58) Field of Classification Search ................ 210/266, 210/282, 493.1, 493.2, 493.5, 251
See application file for complete search history.

(56) References Cited

U.S. PATENT DOCUMENTS

| | | | |
|---|---|---|---|
| 3,733,267 A * | 5/1973 | Haase | 210/669 |
| 4,090,937 A | 5/1978 | Stoev et al. | 204/545 |
| 4,277,332 A | 7/1981 | Baughn | 210/96.2 |
| 4,828,698 A * | 5/1989 | Jewell et al. | 210/266 |
| 4,971,672 A | 11/1990 | Voss et al. | 210/638 |
| 5,094,745 A | 3/1992 | Reynolds | 210/266 |
| 5,527,569 A | 6/1996 | Hobson et al. | 428/35.2 |
| 5,873,920 A * | 2/1999 | Wong et al. | 55/498 |
| 6,080,313 A | 6/2000 | Kelada | 210/631 |
| 6,113,784 A | 9/2000 | Stoyell et al. | 210/493.2 |
| 6,197,193 B1 | 3/2001 | Archer | 210/266 |
| 6,200,471 B1 | 3/2001 | Nohren, Jr. | 210/184 |
| 6,290,848 B1 | 9/2001 | Tanner et al. | 210/266 |

* cited by examiner

*Primary Examiner*—Ivars C. Cintins
(74) *Attorney, Agent, or Firm*—Blynn L. Shideler; Krisanne Shideler; BLK Law Group

(57) ABSTRACT

The filter assembly is adapted for use in filtering fluid flow in turbomachinery. The filter assembly includes a cylindrical housing, and a filter element disposed within the housing. The housing is adapted for fluid connection to a turbomachine. The filter element is adapted to filter fluid passing to the turbomachine. The filter element includes a fluid permeable core element defining a central core element flow channel through the filter element, a fluid permeable ion exchange resin layer disposed about the core element and adapted to remove mineral and organic acids from the fluid passing through the filter element, and a pleated filter media disposed about the ion exchange resin layer and core element. In another embodiment, the filter element has the pleated filter media disposed about the core element, and the fluid permeable ion exchange resin layer disposed about the core element and pleated filter media.

12 Claims, 5 Drawing Sheets

FILTER ASSEMBLY

CROSS REFERENCE TO RELATED APPLICATIONS

This application claims the benefit of U.S. Provisional Patent Application No. 60/442,436, filed Jan. 24, 2003, and entitled "Acid, Particulate, and Water Removal Elements", the entire disclosure of which is incorporated herein in its entirety.

BACKGROUND OF THE INVENTION

1. Field of the Invention

The present invention generally relates to filters used to remove acids, water, particles and other material from fluids and, more particularly, the present invention relates to a filter assembly adapted for use with turbomachinery for filtering fluid flow passing through such turbomachinery.

2. Description of Related Art

Filter elements are used for the removal of various impurities from fluids and have different configurations depending on the desired application. Cylindrical filter elements having radially-extending, longitudinal pleats are a common type of filter element used to filter both liquids and gases. In a typical cylindrical, pleated filter element, a plurality of pleats is arranged around a tubular core to define a cylinder. Although pleated filter elements having this configuration may be efficient in removing particulate matter from fluids, such as removing particulate matter from water or oil, common filter elements do not have the capability of removing other harmful byproducts, such as acids.

In the power generation industry, turbine bearings require a substantial amount of lubrication during operation. Such lubrication often takes the form of synthetic hydraulic oil, because of the need for fire resistance. One example of such a fluid is phosphate ester. It is common for phosphate ester based fluids to chemically break down and produce acids over use and time. For this reason, acid absorbing cartridges are used to filter acid from the synthetic hydraulic oil used in turbomachinery. Cartridges containing fullers earth or activated alumina are commonly used for this purpose. However, both fullers earth or activated alumina have the disadvantage of forming chemical precipitates in the fluid, which can be detrimental to the system. Ion exchange resins are synthetic polymers capable of combining or exchanging ions in a surrounding solution. Ion exchange filters and resins are disclosed in U.S. Pat. No. 6,200,471 to Nohren, Jr.; U.S. Pat. No. 6,113,784 to Stoyell et al.; U.S. Pat. No. 6,197,193 to Archer; U.S. Pat. No. 5,094,745 to Reynolds; and U.S. Pat. No. 4,277,332 to Baughn, which are incorporated herein by reference.

Ion exchange resins can remove acid more efficiently than fullers earth or activated alumina, and without the addition of detrimental chemical precipitates. Ion exchange resins are commonly used in water based fluids, but have only recently been employed for acid removal in hydraulic and lubrication oils. The reason for this is that ion exchange resins naturally contain water, which is detrimental to hydraulic and lubrication oils. For this reason, the use of ion exchange resin filters typically requires additional costly equipment, such as vacuum dehydrators, which are not economically feasible for smaller scale applications.

Acid is not the only contaminate that can degrade the suitability of turbomachinery lubricants. Water can degrade a fluid's lubricity, and particulate matter can damage system components. Additionally, both water and particulate matter act as catalysts in the chemical reactions that form acids in phosphate ester fluids.

SUMMARY OF THE INVENTION

In view of the foregoing, a need exists for a filter assembly that may be used to remove acid and similar impurities from a fluid while also filtering water and particulate matter from the fluid without the use of additional equipment.

The present invention is a filter assembly generally adapted to filter fluid flow in turbomachinery, more specifically to filter a lubricant for turbine bearings. The filter assembly includes a cylindrical housing and a filter element disposed within the housing. The housing may be adapted for fluid connection to a turbomachine. The filter element is disposed within the housing and is adapted to filter fluid passing to or through the turbomachine. In one embodiment, the filter element includes a fluid permeable core element defining a central core element flow channel through the filter element, a fluid permeable ion exchange resin layer disposed about the core element and adapted to remove mineral and organic acids from the fluid passing through the filter element, and a pleated filter media disposed about the ion exchange resin layer and core element.

The filter assembly may include first and second fluid permeable separation layers sandwiching the ion exchange resin layer therebetween. The first separation layer may be disposed immediately about the core element and the second separation layer may be disposed between the ion exchange resin layer and the pleated filter media. The first and second separation layers may be made of glass, cellulose, spun-bonded nylon, or polyester.

The filter assembly may further include a fluid permeable outer casing disposed about the core element, ion exchange resin layer, and pleated filter media. The core element and outer casing may be made of perforated metal, expanded metal, or plastic netting. The pleated filter media may be co-pleated with a wire mesh.

In another embodiment of the filter assembly of the present invention, the filter element has the pleated filter media disposed about the core element, and the fluid permeable ion exchange resin layer disposed about the core element and pleated filter media. The filter assembly may include first and second fluid permeable separation layers sandwiching the ion exchange resin layer therebetween. The first separation layer may be disposed immediately about the pleated filter media, and the second separation layer may be disposed immediately about the ion exchange resin layer. The first and second separation layers may be made of glass, cellulose, spun-bonded nylon, or polyester. The fluid permeable outer casing may be disposed about the core element, pleated filter media, and ion exchange resin layer in this embodiment of the filter assembly.

Further details and advantages of the present invention will become apparent when reading the following detailed description in conjunction with the drawings, wherein like elements are identified by primed reference numerals.

DESCRIPTION OF THE PREFERRED EMBODIMENTS

Figure 1:
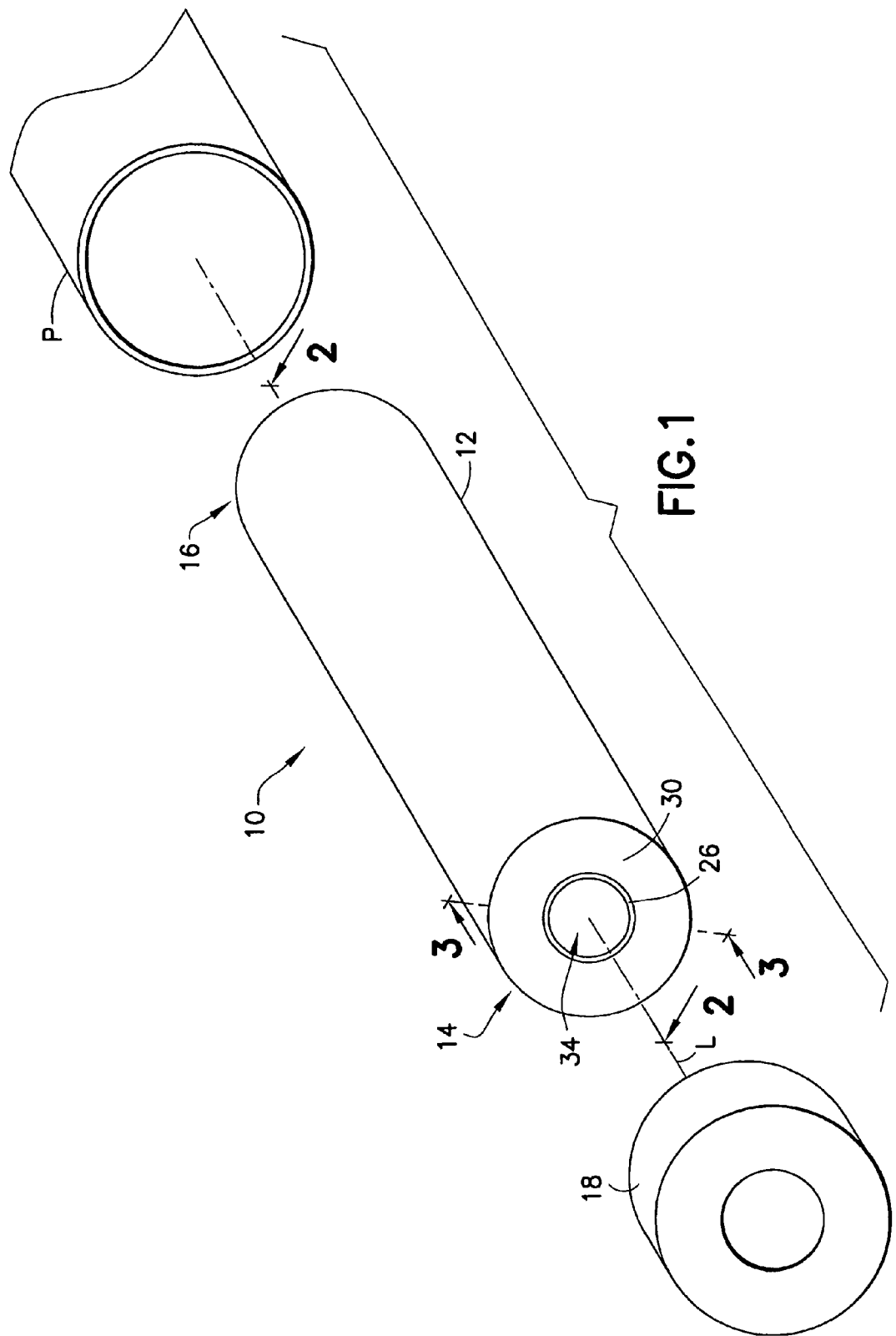
FIG. 1 is an exploded view of a filter assembly in accordance with the present invention.
Figure 2:
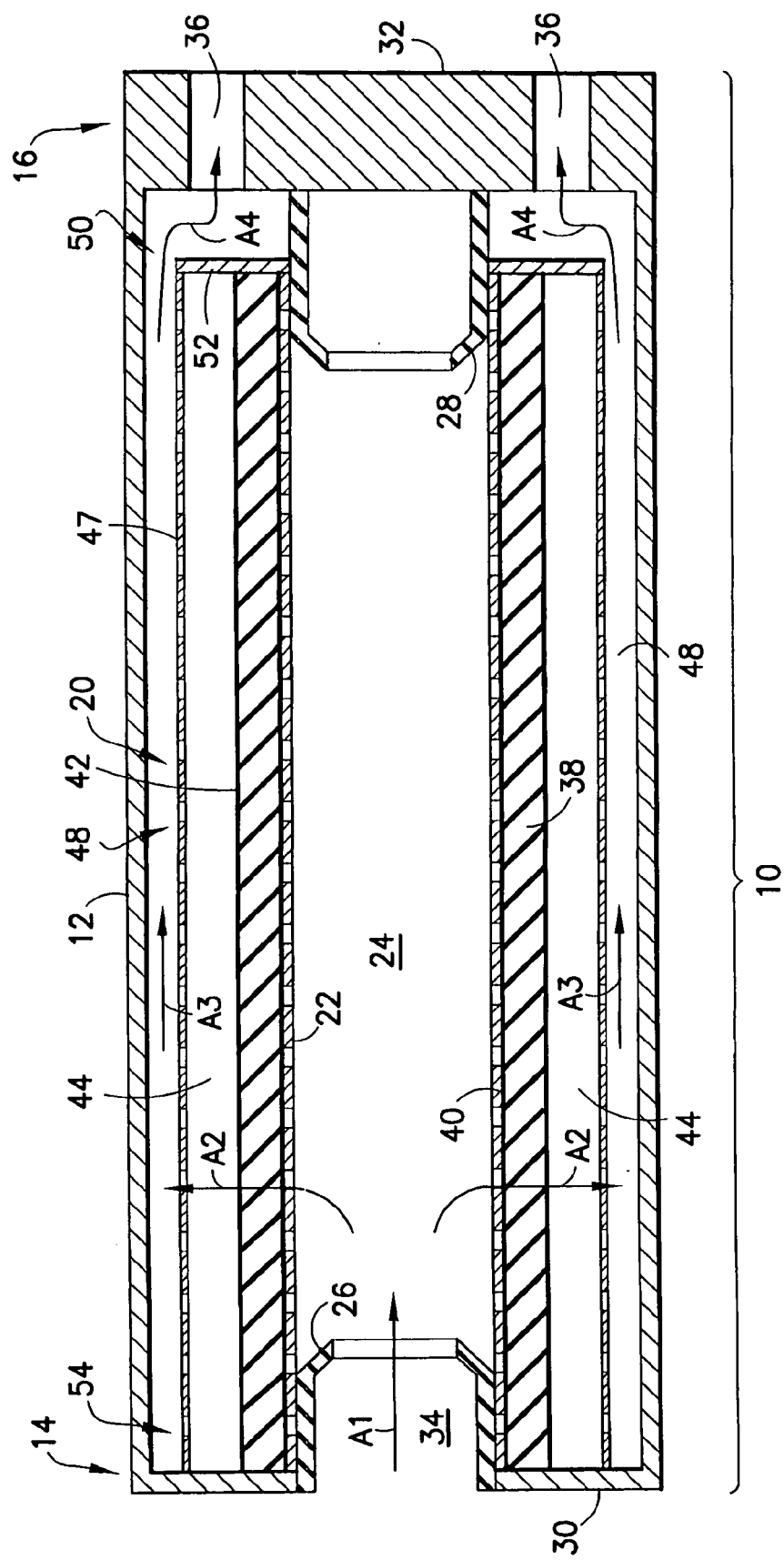
FIG. 2 is a longitudinal cross sectional view taken along lines 2—2 in FIG. 1, showing a filter element in accordance with one embodiment of the present invention.
Figure 3:
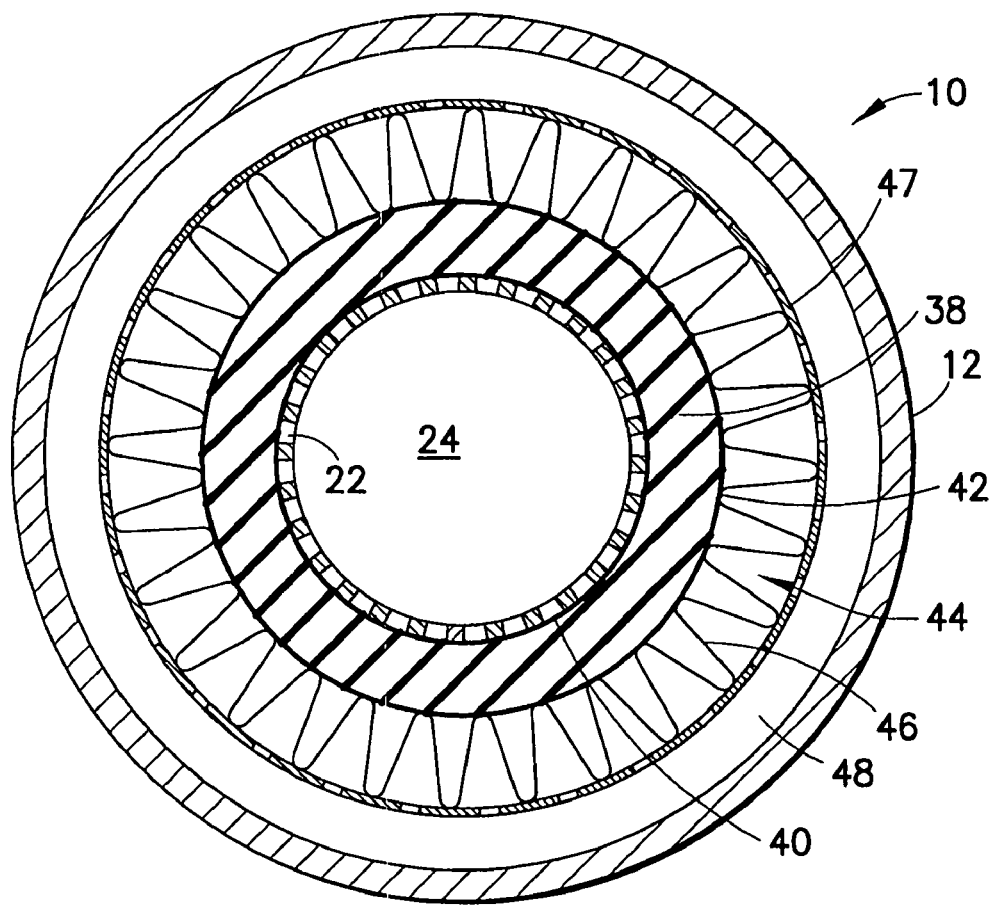
FIG. 3 is transverse cross sectional view taken along lines 3—3 in FIG. 1, showing a cross section of the filter element of FIG. 2.

Referring to FIGS. 1–3, a filter assembly 10 in accordance with one embodiment of the present invention is generally illustrated. The filter assembly 10 is generally cylindrical in form and includes a housing 12 having a first end 14 and a second end 16. The housing 12 is generally cylindrical in form and is preferably made of rigid material such as metal or plastic. The first end 14 of the housing 12 may be enclosed by a removable end cap 18. An O-ring or similar sealing type element (not shown) may be disposed between the end cap 18 and the housing 12 to provide a substantially fluid-tight seal therebetween. In particular, the end cap 18 may be connected with the housing 12 with the interposing of an O-ring, grommet, gasket or other similar structure to provide a substantially fluid tight seal between the end cap 18 and the housing 12.

A primary intended application of the filter assembly 10 is for use in filtering lubricants used in turbomachinery, such as synthetic hydraulic oil used in turbines. In view of this intended application, the second end 16 of the housing 12 is preferably adapted for connection to an inlet conduit to a turbomachine, such as inlet pipe P shown in FIG. 1.

The filter assembly 10 includes a filter element 20 disposed within the housing 12, as shown in FIGS. 2 and 3. In one embodiment, the filter element 20 generally includes a fluid permeable core element 22 disposed along a central longitudinal axis L and defining a central core flow channel 24 through the filter element 20. The fluid permeable core element 22 generally provides rigidity for the filter element 20 and acts to support the filter element 20 against fluid forces acting in a radially inward direction. The core element 22 may be of any suitable design and made of a material having sufficient strength to resist the fluid forces acting on the filter element 20 during operation. For example, the core element 22 may be made from perforated metal or injection molded plastic.

The core element 22 is held centrally in place in the housing 12 by a pair of sealing members 26, 28 extending inward from opposing end walls 30, 32 of the housing 12, respectively. End wall 30 of the housing 12 defines a central inlet aperture 34 for inflow of fluid into the filter element 20, and will be referred to herein as "inlet end wall 30". End wall 32 is located downstream in the direction of fluid flow through the filter element 20 and will be referred to herein as the "outlet end wall 32". The inlet sealing member 26 generally extends through the inlet aperture 34 and permits fluid flow into the body of the filter element 20. The outlet end wall 32 defines one or more outlet apertures 36 for outflow of fluid from the filter element 20. The outlet apertures 36 may be in the form of circle (not shown), or the plurality of outlet apertures 36 shown in FIG. 2 may be replaced by a single outlet aperture 36 in a similar manner and configuration to the inlet aperture 34.

As the cross sections of FIGS. 2 and 3 reveal, an ion exchange resin layer 38 is disposed about the core element 22. The ion exchange resin layer 38 acts as an acid absorber in the filter element 20, and is adapted to remove both mineral and organic acids as well as corrosives from contaminated fluids, such as used in synthetic hydraulic oil used in turbines. The ion exchange resin layer 38 is typically in the form of small particulate or bead-like structures. An example of an ion exchange resin suitable for use in ion exchange resin layer 38 is Dowex™ M-43, manufactured by Dow Chemical. Examples of acids that may be successfully removed with the ion exchange resin layer include HCl, HBr, HF, HI, $H_2SO_4$, $H_3PO_4$, acetic, formic, propionic and benzoic acid.

In a preferred embodiment of the filter element 20 and filter assembly 10, the ion exchange resin layer 38 is disposed or sandwiched between two fluid permeable separation layers, a first separation layer 40 and a second separation layer 42. The first and second separation layers 40, 42 are disposed radially inward and radially outward, respectively, of the ion exchange resin layer 38. The first and second separation layers 40, 42 are optional in the filter element 20 and filter assembly 10 of the present invention. The optional first and second separation layers 40, 42 act to contain the small spherical-shaped particles of the ion exchange resin layer 38 within the filter element 20, and may be made of glass, cellulose, spun-bonded nylon, polyester and like materials.

The filter element 10 further includes a fluid permeable pleated filter media 44 disposed about the core element 22, the ion exchange resin layer 38, and first and second separation layers 40, 42 when present in the filter element 20. The pleated filter media 44 may be conventional in the field and include a plurality of pleats 46 extending radially outward toward the periphery of the filter element 20, and extending longitudinally substantially the length of the filter element 20. Preferably, the pleated filter media 44 includes a sufficient number of pleats 46 so that adjoining pleats 46 contact one another around the circumference of the filter element 20 to provide maximum particulate matter filtration. The pleated filter media 44 may be from glass, or other commonly used materials for pleated media known in the area, for removing particulate matter from fluids including liquids and gases. The pleated filter media 44 functions as the particulate removal layer and water removal layer in the filter element 20 and filter assembly 10 of the present invention. The pleated filter media 44 may also be made of cellulose, absorbent material, glass or other suitable combinations of material so as to allow for effective water and particulate removal.

The optional first and second separation layers 40, 42 and the pleated filter media 44 are preferably seamed along the length of the filter element 20 either with an adhesive epoxy or by other means such as an ultrasonic bond. Thus, while these layers are adjacent to one another, they do not necessarily have to be in direct contact or engagement in accordance with the present invention.

The filter element 10 also includes and outer casing 47 forming the outer periphery of the filter element 20. The outer casing 47 may be made of any conventional design with openings formed therein for the passage of fluid. The outer casing 47 acts to retain the core element 22, ion exchange resin layer 38, the optional first and second separation layers 40, 42, and the pleated filter media 44 in place by providing a rigid support structure therefor. The outer casing 47 also acts to provide a protective covering, for example to protect the pleated filter media 44. Typically, the material of which the outer casing 47 is made of can be selected based on the fluid being filtered and the filtering conditions. Preferably, the outer casing 47 is of a semi-rigid material that allows for the fluid flow, for example a perforated metal. Optionally, the filter element 10 may exclude the presence of the outer casing 47 if the pleated filter media 44 is made of glass or synthetic media which is further co-pleated with a wire mesh.

As indicated, the filter element 20 is disposed within the housing 12. As shown in FIG. 2, the filter element 20 is disposed within the housing 12 so as to define or create an annular flow gap 48 with the interior of the housing 12. The annular flow gap 48 is in fluid communication with the outlet apertures 36 defined by the outlet end wall 32 of the housing 12. The various layers of the filter element 20 are sealed at an outlet end 50 of the filter element 20 by an end cap 52, thus requiring fluid flow through the filter element 20 to pass through the various layers of the filter element 20 and exit into the annular flow gap 48 before being discharged from the filter assembly 10 through the outlet apertures 36 in the housing 12, as discussed further herein. The outlet end cap 52 may be connected to the body of the filter element 20 by any means customary in the art. An inlet end of the filter element 20 is designated with reference numeral 54.

FIGS. 2 and 3 also illustrate the filtering process for fluid passing through the filter element 20. The filter assembly 10 of FIGS. 1-3 exhibits interior to exterior flow therethrough. In operation, a fluid to be filtered, for example, phosphate ester, enters through the inlet aperture 34 in the housing 12 and enters the central flow channel 24 in the core element 22. This stage of the fluid flow is identified with reference arrow A1. The fluid permeates through the various layers of the filter element 20 as depicted by reference arrows A2. In particular, the fluid travels radially outward from the core element 22, through the ion exchange resin 38, optionally both the first and second separation layers 40, 42, the pleated filter media 44, and the outer casing 47 before reaching the annular flow gap 48. As the fluid moves through the ion exchange resin layer 38, the resin chemically removes acids. In general, the ion exchange resin layer 38 acts to remove undesirable acids and impurities in the fluid, while residual contaminants, such as particulate matter and water are removed through the pleated filter media 44. The optional first and second separation layers 40, 42 may also be used to remove contaminates, but are primarily used to contain the components of the ion exchange resin layer 38. Once passing through the filter element 20, the now filtered fluid flows in the annular flow gap 48, as identified by reference arrows A3. The filtered fluid flows through the annular flow gap 48 along the length of the filter element 20 until reaching the outlet apertures 36 at the outlet end of the housing 12.

Figure 4:
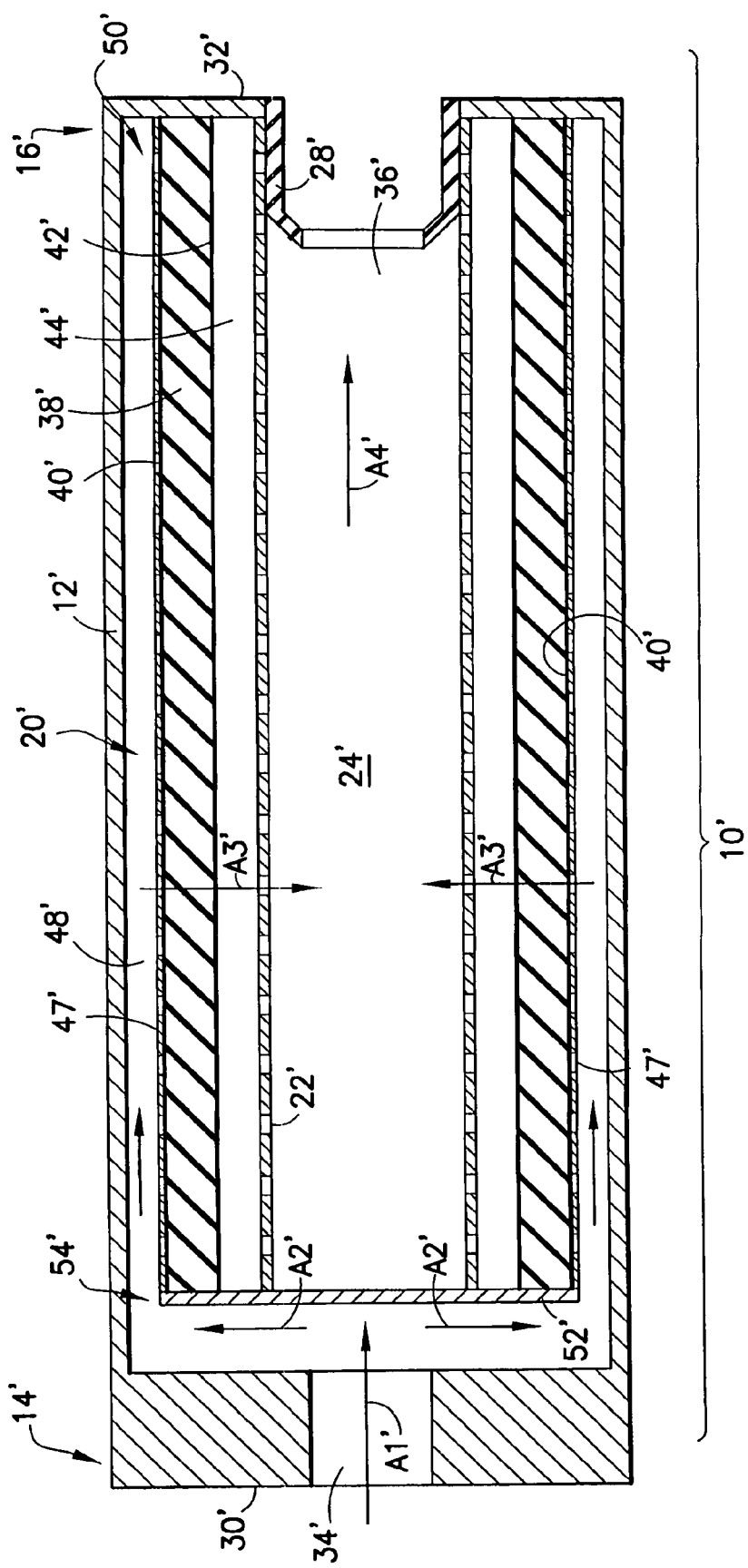
FIG. 4 is a longitudinal cross sectional view of another embodiment of the filter assembly of the present invention.
Figure 5:
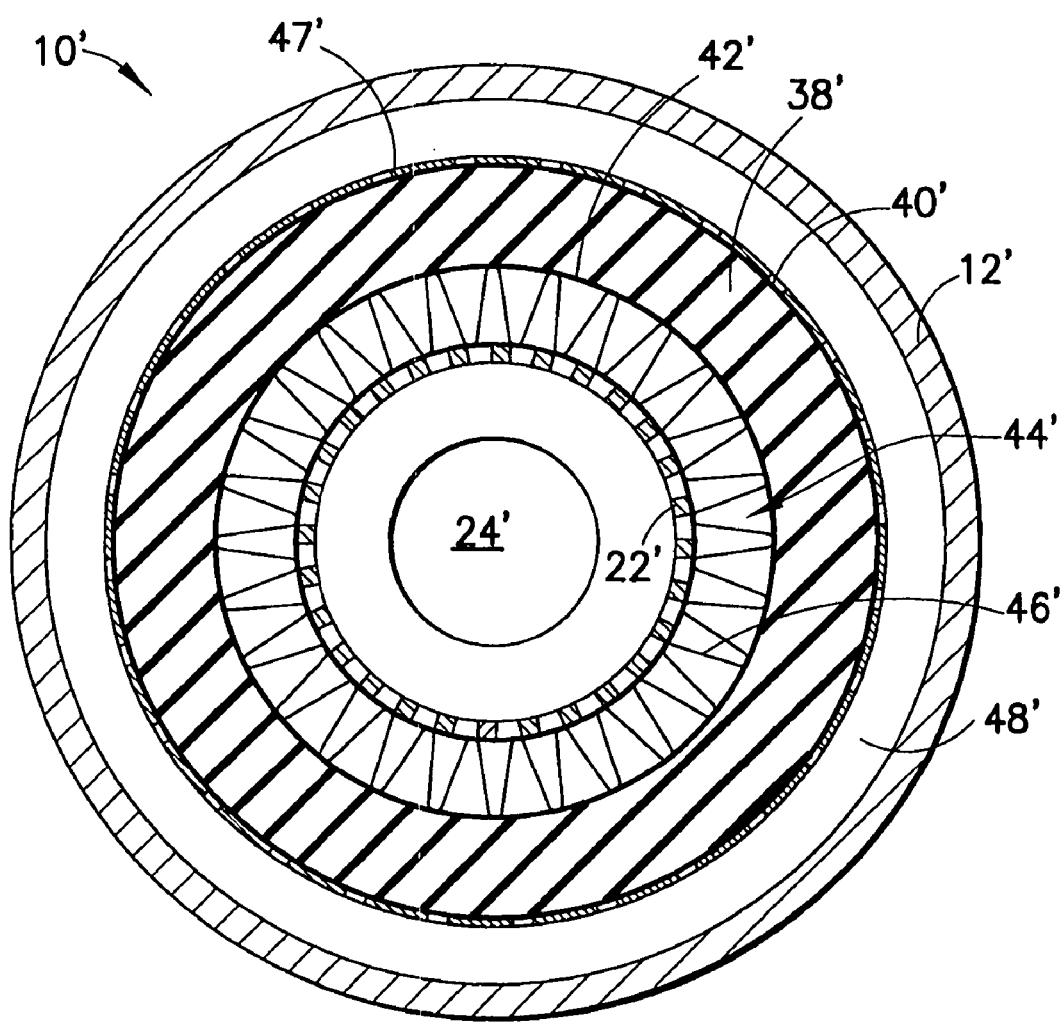
FIG. 5 is a transverse cross sectional view of the filter assembly shown in FIG. 4.

FIGS. 4 and 5 illustrate another embodiment of the filter assembly 10' and filter element 20' of the present invention. The filter assembly 10' differs from the filter assembly 10 discussed previously in that the fluid flow through the filter element 14' is from the exterior to the interior. The filter assembly 10' and filter element 20' are substantially similar in construction to the filter assembly 10 and filter element 20 discussed previously, and only the difference between the respective filter assemblies 10, 10' and filter elements 20, 20' will be discussed herein. In the filter assembly 10', the inlet end 54' of the filter element 20' is spaced from the inlet end wall 30' of the housing 12'. Additionally, the annular end cap 52 previously disposed at the outlet end of the filter element 20 is now disposed at the inlet end 54' of the filter element 20', and secured thereto to cause the fluid flow A1' into the housing to diverge radially outward at the inlet end 54' of the filter element 20' to reach the annular flow gap 48'.

In the filter assembly 10', the outlet end 50' of the filter element 20' is secured to the interior of the outlet end wall 32' of the housing 12', preventing the fluid flow A2' in the annular flow gap 48' from reaching the outlet aperture 36' in the outlet end wall 36' without first passing through the filter element 20'. In the filter assembly 10', the plurality of outlet apertures 36 discussed previously in connection with the filter assembly 10' are replaced by the single outlet aperture 36' shown in FIG. 4. The single outlet aperture 36' is generally defined in the outlet end wall 32' of the housing 12' and by the outlet sealing member 28'.

Another difference between the filter assembly 10 discussed previously and the filter assembly 10' shown in FIGS. 4 and 5 lies in the configuration of the filter element 20' in comparison to the filter element 20. In the filter element 20', the pleated filter media 44' is now disposed immediately about the core element 22', and the fluid permeable ion exchange resin layer 38' is generally disposed about the core element 22' and the pleated filter media 44'. The ion exchange resin layer 38' is still preferably sandwiched or disposed between the two optional first and second separation layers 40, 42.

In operation, as shown generally by arrows A1'–A4' in FIG. 4, the fluid to be filtered enters the inlet aperture 34' and diverges outward into the annular flow gap 48, as indicated by flow arrows A1' and A2' discussed previously. The fluid flows inward through the filter element 20' as indicated by arrows A3' in FIG. 4. The fluid is filtered in the various layers of the filter element 20' in the manner discussed previously in connection with the filter element 20. After passing through the layers of the filter element 20', the filtered fluid enters the central flow channel 24' defined by the core element 22', and ultimately discharges from the filter assembly 10' as indicated by flow arrow A4' via the outlet aperture 36' formed proximate to the outlet end 50' of the filter element 20'.

The filter assemblies 10, 10' shown in FIGS. 1–5 may be further modified to filter other substances. For example, a desiccant layer may be added to the filter elements 20, 20' to help eliminate contaminated water from the fluid to be filtered. The desiccant may also be added directly to the pleated filter media 44, 44'. Moreover, a desired additive layer may also be added to the filtered fluid after the fluid to be filtered passes through the ion exchange resin layer 38, 38' and the pleated filter media 44, 44'. Similarly, an additive may also be added directly to the ion exchange resin layer 38, 38' or the pleated filter media 44, 44', depending on the flow direction of the fluid to be filtered.

The filter assemblies 10, 10' of the present invention could be used in any fluid where acid is a problem. Turbine lubrication systems are but only one potential application. Phosphate ester is a fire resistant fluid and is often used in other high temperature applications, like rolling mills. The filter assemblies 10, 10' may even be used in standard oil type applications, if acid removal is desired.

While the present invention was described with reference to preferred embodiments of the filter assembly, those skilled in the art may make modifications and alterations to the present invention without departing from the scope and spirit of the invention. Accordingly, the foregoing detailed description is intended to be illustrative rather than restrictive. The invention is defined by the appended claims, and all changes to the invention that fall within the meaning and range of equivalency of the claims are to be embraced within their scope.

The invention claimed is:

1. A filter assembly for filtering lubricant fluid in turbomachinery, comprising:

a cylindrical housing, the housing connected to the lubricant fluid inlet conduit of the turbomachine; and a filter element disposed within the housing and adapted to filter the lubricant fluid passing to the turbomachine, the filter element comprising:

a fluid permeable core element defining a central core element flow channel through the filter element;

a fluid permeable ion exchange resin layer concentrically disposed about the core element and adapted to remove mineral and organic acids from the lubricant fluid passing through the filter element; and a pleated filter media disposed adjacent the ion exchange resin layer and downstream of the ion exchange resin layer.

2. The filter assembly of claim 1, further comprising first and second fluid permeable separation layers sandwiching the ion exchange resin layer there between, wherein the ion exchange resin layer is constructed to remove at least one of HCL, HBr, HF, HI, $H_2SO_4$, $H_3PO_4$, acetic, formic, propionic and benzoic acid from the lubricant fluid.

3. The filter assembly of claim 2, wherein the first separation layer is disposed immediately about the core element and the second separation layer is disposed between the ion exchange resin layer and the pleated filter media, and wherein the ion exchange resin layer is configured to remove acid from synthetic hydraulic fluid.

4. The filter assembly of claim 2, wherein the first and second separation layers are made of a material selected from the group consisting of glass, cellulose, spun-bonded nylon, and polyester, wherein the pleated media is structured to remove particulate and water from the lubricant fluid and wherein the ion exchange resin layer is upstream of the pleated filter media.

5. The filter assembly of claim 1, further comprising a fluid permeable outer casing disposed about the core element, ion exchange resin layer, and pleated filter media, and wherein the ion exchange resin layer is constructed to remove at least one of HCL, HBr, HF, HI, $H_2SO_4$, $H_3PO_4$, acetic, formic, propionic and benzoic acid from the lubricant fluid.

6. The filter assembly of claim 5, wherein the core element and outer casing comprise perforated metal or ceramic material, and wherein the ion exchange resin layer is upstream of the pleated filter media.

7. The filter assembly of claim 1, wherein the pleated filter media is co-pleated with a wire mesh and is structured to remove particulate and water from the lubricant fluid.

8. A filter assembly for filtering lubricant fluid in turbomachinery, comprising:

a cylindrical housing, the housing connected to the lubricant fluid inlet conduit of the turbomachine; and a filter element disposed within the housing and adapted to filter lubricant fluid passing to the turbomachine, the filter element comprising:

a fluid permeable core element defining a core element flow channel through the filter element;

a pleated filter media disposed about the core element; and a fluid permeable ion exchange resin layer disposed about the core element and pleated filter media and adapted to remove mineral and organic acids from the lubricant fluid passing through the filter element upstream of the pleated filter media.

9. The filter assembly of claim 8, further comprising first and second fluid permeable separation layers sandwiching the ion exchange resin layer there between, and wherein the ion exchange resin layer is upstream of the pleated filter media.

10. The filter assembly of claim 9, wherein the first separation layer is disposed immediately about the pleated filter media and the second separation layer is disposed immediately about the ion exchange resin layer and the pleated media is structured to remove particulate and water from the lubricant fluid.

11. The filter assembly of claim 9, wherein the first and second separation layers are made of a material selected from the group consisting of glass, cellulose, spun-bonded nylon, and polyester, and wherein the ion exchange resin layer is configured to remove acid from synthetic hydraulic fluid.

12. The filter assembly of claim 8, further comprising a fluid permeable outer casing disposed about the core element, pleated filter media, and ion exchange resin layer, and wherein the ion exchange resin layer is constructed to remove at least one of HCL, HBr, HF, HI, $H_2SO_4$, $H_3PO_4$, acetic, formic, propionic and benzoic acid from the lubricant fluid.

* * * * *